No. 878,205. PATENTED FEB. 4, 1908.
G. M. D. HEARD.
BRACE.
APPLICATION FILED APR. 27, 1907.
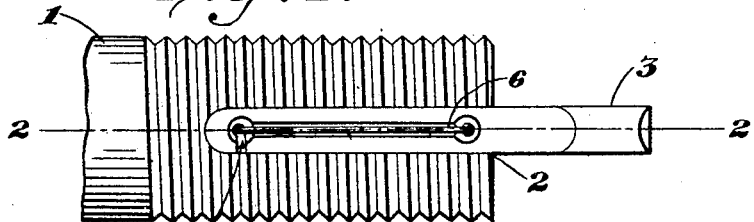
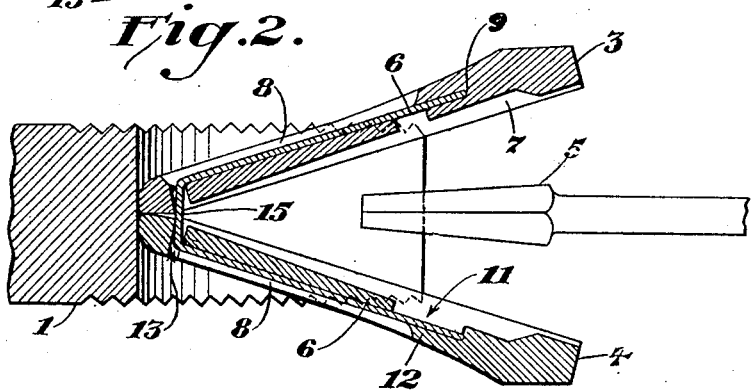
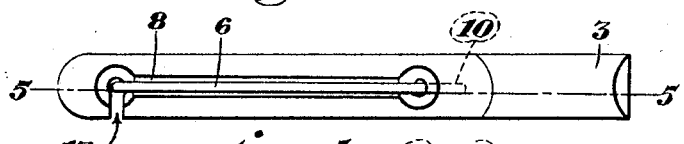
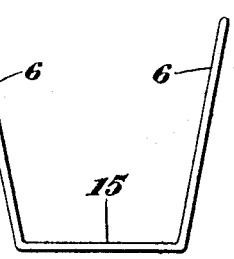
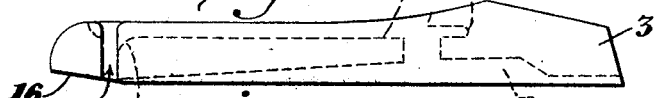
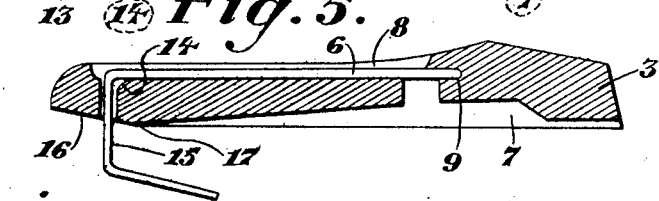
Witnesses:
Chas. G. Becker
Elliott R. Goldsmith
Inventor:
George M. D. Heard,
By Hugh H. Wagner,
His Attorney.

UNITED STATES PATENT OFFICE.

GEORGE M. D. HEARD, OF PAINESVILLE, OHIO.

BRACE.

No. 878,205.   Specification of Letters Patent.   Patented Feb. 4, 1908.

Application filed April 27, 1907. Serial No. 370,602.

*To all whom it may concern:*

Be it known that I, GEORGE M. D. HEARD, a citizen of the United States, residing at the city of Painesville, in the county of Lake and State of Ohio, have invented certain new and useful Improvements in Braces, of which the following is a specification, reference being had therein to the accompanying drawings.

This invention relates to bit-braces, and has for its object to provide a new and improved construction in chuck-jaws which grasp and hold the bit.

While this invention is particularly adapted for use in connection with a brace of the type described in my prior United States patent No. 779,079, issued January 3, 1905, it can, also, be used in connection with any other brace in which a removable bit is held between a pair of chuck-jaws. In such braces, the chuck is caused to rotate by a suitable handle, ratchet, or lever (not shown in the drawings), and a bit, held in said chuck by appropriate devices, such as the one forming the subject-matter of the present application is, accordingly, caused to rotate, thereby to bore a hole, turn a screw, or to perform some similar operation.

In the drawings forming part of this specification, in which like numbers of reference denote like parts wherever they occur, Figure 1 is a side elevation of a chuck equipped with the hereindescribed jaws; Fig. 2 is a sectional view on the line 2—2, Fig. 1; Figs. 3 and 4 are, respectively, top and side views of one of the jaws; Fig. 5 is a sectional view on the line 5—5, Fig. 3; and Fig. 6 is a view of the spring.

As is usual in braces of the type hereinabove referred to, the chuck 1 is externally threaded, so as to receive a revoluble adjusting-and-tightening drum (not shown). A slot 2 is cut deeply therein, the clamping jaws 3 and 4, which jaws clasp the tapered shank 5 of the bit and hold the bit to the chuck, being placed within said slot. A bifurcated spring 6 serves to keep the outer ends of the jaws spaced apart from each other, but when the adjusting drum is turned upon the chuck so that said drum moves from left to right engaging the jaws 3 and 4, Fig. 1 or 2, the jaws are forced toward each other, and thus firmly grasp the bit shank 5. Each jaw has a gripping concavity at 7 in which shank 5 is received, said concavity being similar in shape to the bit shank 5, so that the jaws can most effectively grasp the bit, and, where so desired, the surface of the concavity 7, or the faces of shank 5, may be rasped or roughened, so that the bit may be still more securely gripped by the jaws.

The outer face of each of the jaws 3 and 4 is grooved at 8, said grooves receiving the arms of the wire spring 6. Formed in each jaw in such position as to register with its groove 8 is a recess 9, into which recesses the ends 10 of the spring-arms 6 are inserted. Said recess may be made either by forming a cylindrical hole in the solid metal, as in jaw 3, Fig. 2, or, as illustrated in jaw 4, the recess 9 may be formed by providing a slot 11 on the inner side of the jaw, said slot being of just the right depth to leave a web of metal 12 against which the end 10 of the spring can bear.

On one side of each jaw, and adjacent the end thereof opposite the end which engages the bit-shank 5, is a slot 13, said slot being disposed at right angles to groove 8, and being cut to a depth slightly greater than the perpendicular distance from the slotted side of the jaw to that edge of groove 8 which is farthest removed from said side. The corner 14 where groove 8 adjoins slot 13 is curved or rounded, so that the spring 6 can readily adjust itself as the jaws are opened and closed, and, at the same time, not be abraded by a sharp edge.

When it is desired to assemble the device, one end 10 of spring 6 is inserted into the recess 9 of one of the jaws, either said jaw or the spring is then turned so that the cross-arm 15 of said spring passes through slot 13, the position to which the parts are thus brought being that shown in Fig. 5. The other end of the spring is then seated within the recess 9 of the other jaw, which other jaw is then turned so that the cross-arm 15 passes through its slot 13 also, and, when this has been done, the jaws and spring are assembled as shown in Fig. 2. The device can, thereupon, be placed in the chuck, and is ready for use. The ends adjacent the slots are beveled as at 16, so that the jaws are fulcrumed at 17 upon each other.

I am aware that chuck-jaws are known which have a spring in connection therewith to keep the jaws normally spaced apart. Such springs, however, are usually riveted to the jaws, or are bent permanently into place, so that to assemble these devices is a more complex and difficult operation than with my herein-described invention, and very frequently a separate and special tool is required in order to assemble their parts. In my invention, the assembling is all done by a very simple manual operation, and, moreover, the members can be taken apart just as easily as they can be put together. The jaws are interchangeable, i. e., they are neither rights nor lefts, so that they can be made in quantities from a single pattern, and at the minimum expense, and, as the springs are readily removable, a broken spring can very quickly be replaced by a new one.

Having thus described my said invention what I claim and desire to secure by Letters Patent is:

1. A chuck-jaw having a concavity to receive the bit-shank, a recess to receive a spring, and a longitudinal groove on the side opposite said concavity, said recess being cut from the shank-receiving concavity to a depth which leaves a web of metal on the side of said jaw opposite said concavity, said groove being in substantial alinement with said recess, said spring fitting into said groove and said recess and bearing against said web.

2. A pair of chuck-jaws each having a longitudinal groove on the outer side thereof, a slot disposed at right angles to said groove and extending from a point adjacent the end thereof to one side of the jaw, and a socket in substantial alinement with said groove, combined with a spring, which spring comprises a pair of approximately straight side-arms and an approximately straight cross-arm, said side-arms resting in said groove and the ends thereof seating in said sockets, said cross-arm passing through said slots.

3. A pair of chuck-jaws, each having a groove on the outer side thereof, a slot at right angles to said groove, and a spring-receiving socket, combined with a spring which passes through said slots, rests in said grooves, and seats in said sockets.

4. A pair of chuck-jaws, each having a socket and a slot therein, and a spring which passes through said slots and projects into said sockets, said spring extending in approximately a straight line from said slots to said sockets, said slots being at right angles to those arms of the spring which are inserted in said sockets.

5. A pair of chuck-jaws, each having a longitudinal groove on the outer side thereof, a slot cut inwardly from one side of the jaw at right angles to said groove to a depth equaling the distance from the side of the jaw to the wall of said groove farthest removed therefrom, and a socket in substantial alinement with said groove, combined with a spring which passes through said slots, rests in said grooves, and seats in said sockets.

6. A pair of chuck-jaws, each having a socket and a slot therein, said slots being cut inwardly from one side of the jaw and approximately at right angles to the lengthwise dimension thereof, combined with a spring which passes through said slots and seats in said sockets, the socket in each jaw being disposed at right angles to the slot therein.

7. In a device of the character described, the combination of a spring, a pair of jaws, each of which is provided with a slot cut in a plane which is at right-angles to the lengthwise dimension of the jaw, the slotted sides of the jaws being opposite each other, said slots being of such depth that the innermost part of one registers with the innermost part of the other when said jaws are placed in gripping position, said spring being adapted to pass through the registering parts of said slots, and means on each jaw for holding an end of said spring.

In testimony whereof I have affixed my signature in presence of two witnesses.

GEORGE M. D. HEARD.

Witnesses:
 ROBT. H. GITTINS,
 MAMIE E. FELL.